US008316114B2

(12) United States Patent
Peng

(10) Patent No.: US 8,316,114 B2
(45) Date of Patent: Nov. 20, 2012

(54) UPDATING IP ADDRESS DATABASE BASED ON TRANSACTION INFORMATION

(75) Inventor: Xiang Peng, Hangzhou (CN)

(73) Assignee: Alibaba Group Holding Limited, George Town, Grand Cayman (CY)

( * ) Notice: Subject to any disclaimer, the term of this patent is extended or adjusted under 35 U.S.C. 154(b) by 0 days.

(21) Appl. No.: 12/928,632

(22) Filed: Dec. 14, 2010

(65) Prior Publication Data

US 2011/0153681 A1 Jun. 23, 2011

(30) Foreign Application Priority Data

Dec. 17, 2009 (CN) .......................... 2009 1 0259231

(51) Int. Cl.
*G06F 15/177* (2006.01)
*G06F 15/173* (2006.01)
*G06F 7/00* (2006.01)

(52) U.S. Cl. ......... 709/220; 709/223; 707/803; 707/812

(58) Field of Classification Search ........................ None
See application file for complete search history.

(56) References Cited

U.S. PATENT DOCUMENTS

| 7,903,540 | B2 | 3/2011 | Shousterman et al. |
| 2003/0220900 | A1 | 11/2003 | Gabor |
| 2005/0071417 | A1* | 3/2005 | Taylor et al. .................. 709/200 |
| 2006/0168164 | A1* | 7/2006 | Lemson et al. ............... 709/221 |
| 2009/0291630 | A1 | 11/2009 | Dunn et al. |

* cited by examiner

*Primary Examiner* — Kuen Lu
*Assistant Examiner* — Berhanu Mitiku
(74) *Attorney, Agent, or Firm* — Van Pelt, Yi & James LLP

(57) ABSTRACT

Updating an Internet Protocol (IP) address database includes: obtaining transaction address data from a transaction information database, the transaction address data including IP address information and geographical address information received during user transactions; processing the transaction address data to identify specific transaction address data that have overlapping geographical address information and contiguous IP addresses; and updating the IP address database according to the overlapping geographical address information and the contiguous IP addresses.

9 Claims, 5 Drawing Sheets

UPDATING IP ADDRESS DATABASE BASED ON TRANSACTION INFORMATION

CROSS REFERENCE TO OTHER APPLICATIONS

This application claims priority to People's Republic of China Patent Application No. 200910259231.3 entitled A METHOD AND DEVICE OF UPDATING IP ADDRESS DATABASE filed Dec. 17, 2009 which is incorporated herein by reference for all purposes.

FIELD OF THE PRESENT INVENTION

The present application relates generally to the field of network technology, and more particularly to IP address database updates.

BACKGROUND OF THE PRESENT INVENTION

The Internet connects different hardware, operating systems and networks world-wide. Transmission Control Protocol (TCP) and (Internet Protocol) IP are the principal communications protocols used for implementing Internet based networking. Nodes on the Internet have unique IP addresses assigned by Internet Assigned Numbers Authority (IANA).

An IP address database, as the name suggests, is a database that stores IP addresses. A comprehensive and accurate IP address database can help users of the database identify every computer on the interne correctly. In practice, data stored in IP address database on the Internet is mostly not obtained from IANA directly but through private collections. Thus, IP address information in IP address database is usually not comprehensive and sometimes even erroneous. Furthermore, the typical IP address database lacks detailed geographical location data. In most IP address databases, geographical location data is often on the country or state/province level. For example, an entry in the database may indicate that IP address range 119.253.0.0-119.253.0.15 corresponds to the geographical address of China, or that 119.253.0.10-119.253.0.11 corresponds to the geographical address of Hunan Province, China. Administrators of IP address databases typically have to manually supplement the database with more detailed information and/or correct information in the database. The manual update process can be time consuming, expensive, and error-prone.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
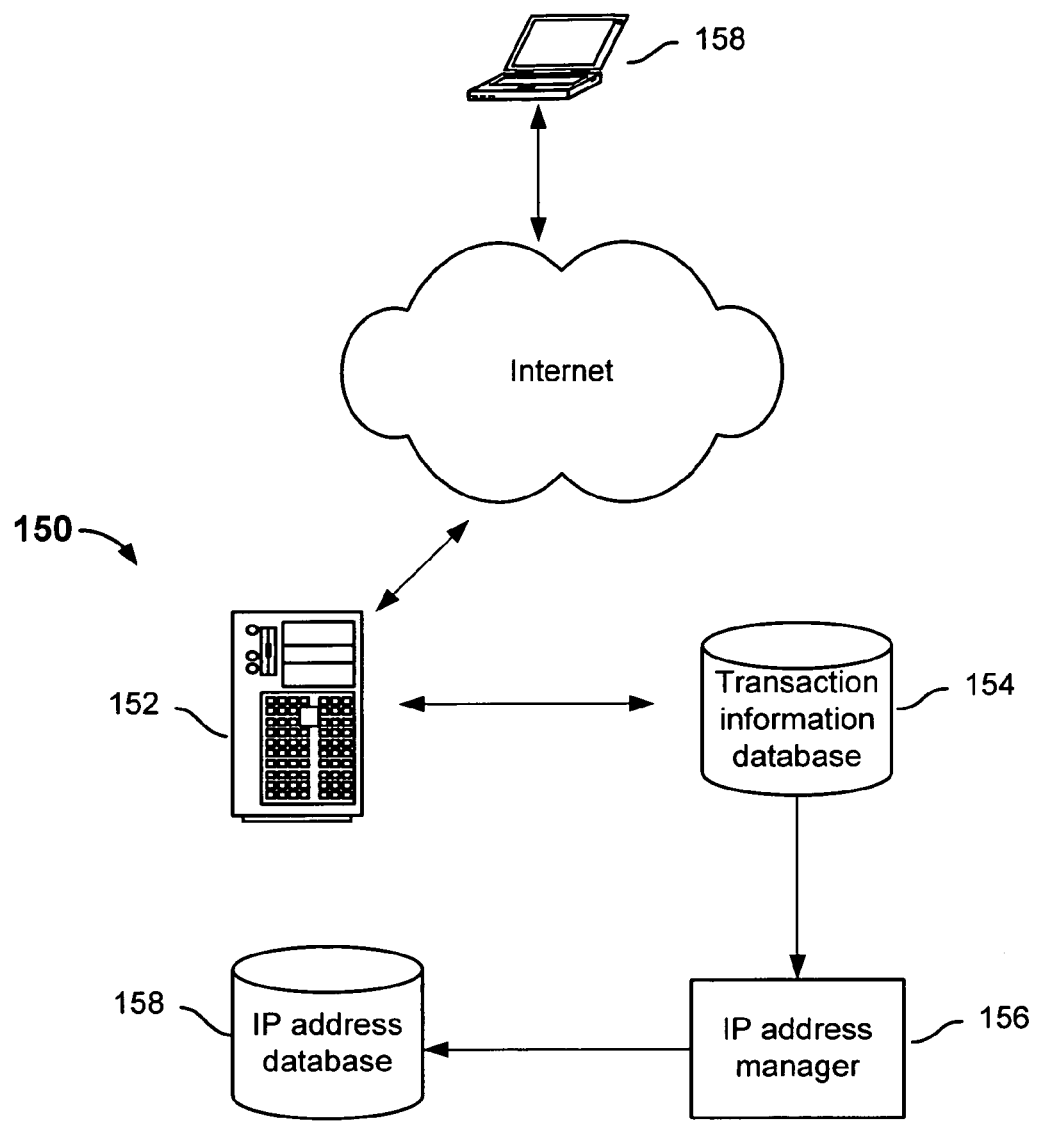
FIG. 1A is a block diagram illustrating an embodiment of a system for maintaining an IP address database.

FIG. 1A is a block diagram illustrating an embodiment of a system for maintaining an IP address database. In the example shown, users access a website 150 using Internet enabled client devices 158, such as computer terminals or smart phones. In this example, website 150 is an e-commerce website on which users can make online purchases. Once a transaction is completed, transaction information is sent to web server 152, which stores the information in transaction information database 154. The transaction information includes name of purchased merchandise, price, mailing address of the user, IP address of the client device through which transaction is conducted, etc.

An IP address database 158 is used to store IP address information. In some embodiments, the IP address database stores IP address ranges and geographical addresses that correspond to the IP address ranges. For example, IP address database entries may indicate that the IP address range of 1.12.0.0-1.15.255.255 corresponds to China; IP address range of 1.16.0.0-1.16.255.255 corresponds to Korea, etc. In some embodiments, the IP address database is initialized based on a third party database. In some embodiments, frequently used data from IP address database is pure version data from IP address database. Pure version of IP address database uses only one file (e.g., QQWry.dat) to include all the records related to IP address, so that it can be easily embedded to other program and easily updated.

An IP address manager 156 obtains address information from the transaction information database, processes the information, and updates IP address database 158. The IP address manager's operations are described in greater detail below. The IP address manager may be implemented in any appropriate manner, such as a software component executing on one or more processors/electronic devices, hardware such as programmable logic devices and/or Application Specific Integrated Circuits, or a combination thereof. The IP address manager may be implemented as a part of the web server or on a separate device.

Figure 1B:
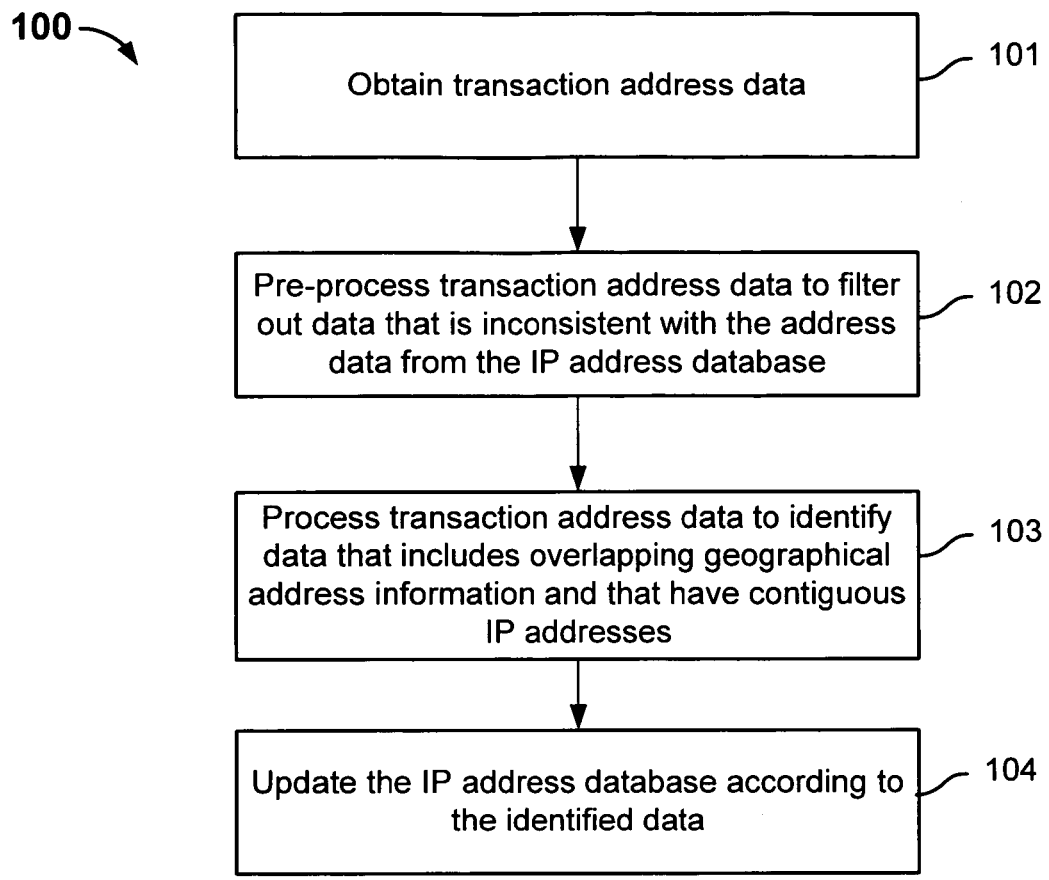
FIG. 1B is a flowchart illustrating an embodiment of a process for updating an IP address database.

FIG. 1B is a flowchart illustrating an embodiment of a process for updating an IP address database. Process 100 may be implemented on an IP address manager such as 156 of FIG. 1A.

At 101, transaction address data in a transaction information database is obtained. As seen in FIG. 1A, the user enters transaction information on the website, and the transaction information database keeps track of the transaction information. The transaction address data includes IP address information of the client device used by the user to conduct the transaction, and the user's geographical address (also referred to as physical address). In some embodiments, the geographical address is obtained from the user's input during the transaction, such as billing address, shipping address, etc. In some embodiments, the transaction address data includes finer grained geographical address information than the address data in the IP database. For example, the geographical address from the transaction address data may include street, city, state, and country information while the geographical address data from the IP address database only includes state and country information.

At 102, the transaction address data is optionally preprocessed to filter out any data that is inconsistent with the address data from the IP address database. In some embodiments, the preprocessing includes locating address data from the IP address database that has the same IP addresses as each transaction address data item, comparing the respective geographical addresses, and determining whether there is any inconsistency. If there is an inconsistency, the transaction address data item is not further processed. For example, a transaction address data item from the transaction information database has an IP address of 1.12.3.4 and corresponds to the geographical address of 30 Yudaojie, Nanjing, Jiangsu Province, China. If the same IP address in the IP address database corresponds to Jiangsu Province, China, then the geographical addresses are consistent and the transaction address data item is processed. If, however, the same IP address in the IP address database corresponds to Hunan Province, China, then the geographical addresses are inconsistent; therefore, the transaction address data item is discarded and not further processed.

At 103, transaction address data is processed to identify data that include at least some overlapping geographical address information and that have contiguous IP addresses. Two geographical addresses are deemed to be overlapping if they have the same information at a predetermined level of the address hierarchy, such as the same province, the same city, etc. The corresponding overlapping geographical addresses and contiguous IP addresses are obtained. In some embodiments, the number of transaction address data entries that have the same geographical address information and contiguous IP addresses is determined and compared with a predetermined threshold. If the number of the transaction address data is greater than the threshold, the IP addresses of the transaction address data are merged into one IP address range, and the overlapping geographical address information is set as the corresponding geographical address information of the IP address range.

At 104, the IP address database is updated according to the identified data, i.e., the geographical address information and the IP address range obtained in 103. Specifically, if the geographical address information of the IP address range in the IP address database is less detailed than the geographical address information of the transaction address data, the former is then replaced with the latter.

In some embodiments, a large amount of transaction address data is used for automatic supplement and verification of the existing geographical addresses in the IP address database to achieve high accuracy and coverage rate. Data from IP address database and transaction address data only needs to be scanned twice, and manual collection is not required. Thus, high efficiency is obtained in supplementing and verifying the existing IP database.

Figure 2:
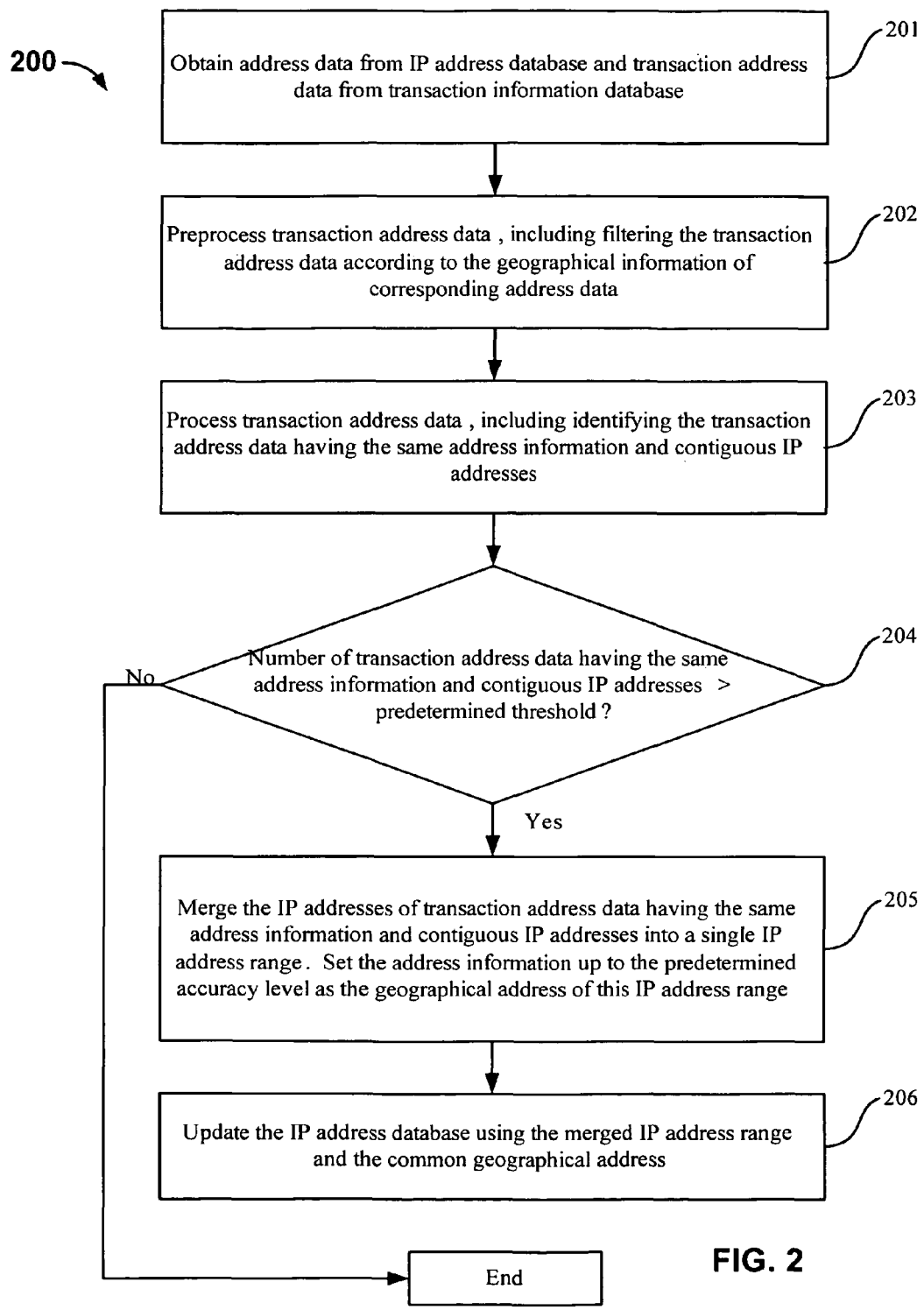
FIG. 2 is a flowchart illustrating another embodiment of a process for updating an IP address database.

FIG. 2 is a flowchart illustrating another embodiment of a process for updating an IP address database. Process 200 may be implemented on an IP address manager.

At 201, address data is obtained from IP address database, and transaction address data is obtained from transaction information database. In some embodiments, the transaction address data is also sorted according to the increasing or decreasing order of IP addresses.

Address data from the IP address database includes IP addresses and corresponding geographical address information. In some embodiments, the IP addresses include an IP address range. For example, according to an IP database initially populated based on QQWry.dat, the IP address range of 192.168.0.1 to 192.169.5.252 corresponds to Wuhan City, Hubei province, China.

Transaction information database is located on the website, and is used for storing information entered by users' of the website during transactions. Transaction address data includes IP addresses and geographical address information such as the users' shipping addresses and/or billing addresses. For example, an e-commerce website such as taobao.com records the IP addresses and mailing addresses of customers who log onto the site and successfully makes a purchase, and stores the data in the transaction information database. The website collects transaction address data over a period of time, sometimes months or years to ensure that sufficient quantity of data is collected to accurately represent the IP address/geographical address correspondence.

In some embodiments, geographical address information is hierarchical. For purposes of illustration, the following hierarchy is discussed in detail in connection with the examples: country, province, county, municipality, street, and house number. Other hierarchies may be used in various embodiments, such as country, state, city, street, and house number. Geographical address information from existing IP address database such as QQWry.dat is typically coarse grained, having only country and province level information. The geographical address information in transaction address data is usually more detailed; for example, it may include municipality, street and house number information. Thus, the more detailed geographical data from transaction address data can be used to supplement the IP address database.

Although IP addresses of client devices from geographical regions that are close in proximity usually belong to a contiguous IP address range, individual mailing addresses can be highly variable and may not efficiently and accurately represent the physical address that corresponds to the IP address. For example, a user using a client device located in one province may enter a shipping address that is in a different province; therefore, the geographical address from this transaction does not accurately indicate the geographical location of the IP address. Thus, at 202, transaction address data is preprocessed, including filtering the transaction address data according to the geographical information of the IP address data.

In some embodiments, the filtering includes a determination of whether the geographical address information of particular transaction address data is consistent with the geographical address information of corresponding address data from the IP address database at a preset filtering level. If not, the particular transaction address data is not processed further and is discarded from the list of transaction addresses obtained in step 201. In some embodiments, the filtering level is done at the province level of the geographical address hierarchy. In other words, it is determined whether the province level address in the geographical address data is the same for particular transaction address data and for the address data that has the same IP address and came from the IP address database. For example, particular transaction address data has an IP address of 192.168.0.2, and a geographical address of No. 30, Yudaojie Street, Baixia District, City of Nanjing, Jiangsu Province, China. According to the IP address database, however, IP addresses in the range of 192.168.0.1 to 192.169.5.252 map to the geographical region of Hubei Province. The geographical address information of the particular transaction address data does not match the corresponding geographical address information from the IP address database and is therefore deemed to be inconsistent, and the particular transaction address data should not be further processed. While the province level in the hierarchy of geographical address information is used for filtering the geographical data in this example, other hierarchical levels may be used in different embodiments and similar filtering technique applies.

Additionally, if an IP address of particular transaction address data has no corresponding geographical address information in the IP address database, the particular transaction address data is retained.

At 203, transaction address data is processed. Specific transaction address data having the same address information at a predetermined accuracy level (i.e., having overlapping address information) and having contiguous IP addresses are identified, and the number of such transaction address data is determined.

Specifically, the accuracy level of the address information is preset for determining whether address information of transaction address data are overlapping. Predetermined accuracy of address information may be municipal address, county address, district address or more detailed level. Whether address information of transaction address data is overlapping depends on the accuracy of address information. For example, there are two pieces of transaction address data, one having geographical address of County C, Municipality B, and Province A, and another having geographical address of County D, Municipality B, and Province A. The IP addresses of the two pieces of data are the same. If the predetermined accuracy of address information is at the municipal level, then the two pieces of transaction address data are deemed to be overlapping; if the predetermined accuracy of address information is county level, then the two pieces of transaction address data are deemed to be non-overlapping.

At 204, it is determined whether the number of transaction address data having the same geographical address information up to the accuracy level and having contiguous IP addresses is greater than a predetermined threshold. If so, the transaction address data are deemed to accurately represent the IP address range/geographical address mapping, and control is transferred to 205; otherwise, the set of transaction address data is deemed to be too small to accurately represent the IP address range/geographical address mapping, thus the process is finished and the IP address database is unmodified.

At 205, the IP addresses of transaction address data having the same address information and contiguous IP addresses are merged into a single IP address range. The address information up to the predetermined accuracy level is set as the geographical address of this IP address range. Specifically, if the geographical addresses of two pieces of transaction address data are the same, then their IP addresses can be merged into one section. The IP address manager continuously scans transaction address data until transaction address data with different geographical address appears. The IP address manager then merges the IP addresses corresponding to the same physical address into one range, and sets the section as the biggest contiguous IP section with same physical address.

At 206, the merged IP address range and the geographical address are used to update the IP address database. Specifically, geographical addresses corresponding to IP address range is used to replace the initial geographical address information in IP address database corresponding to the IP address range.

In some embodiments, it is also determined whether the geographical address corresponding to the merged IP address range is more specific than the geographical address information in the IP address database corresponding to the same IP address range. If so, the geographical address corresponding to the merged IP address range replaces the corresponding geographical address in the IP address database. Otherwise, the IP address database is unchanged.

Figure 3:
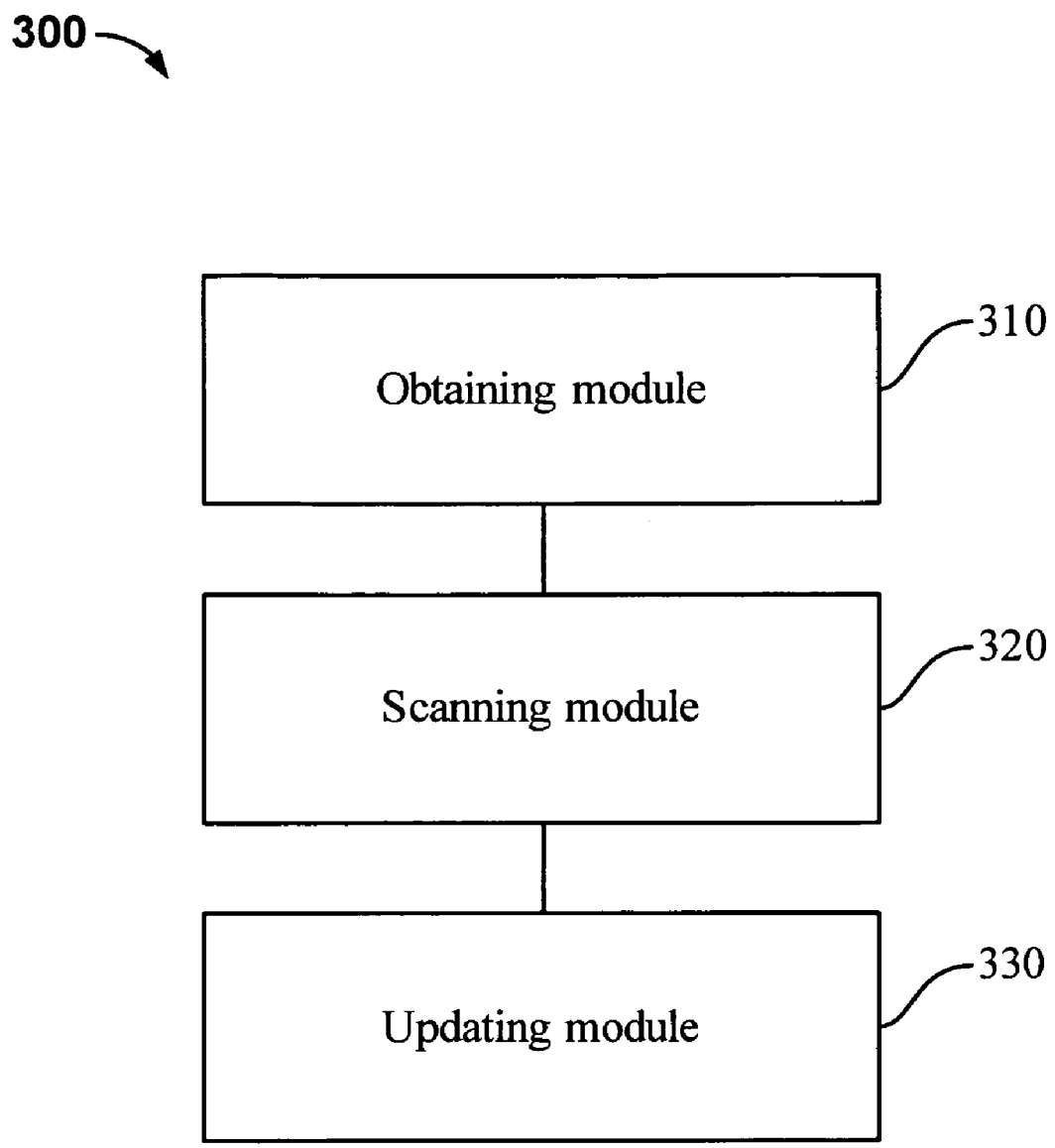
FIG. 3 is a block diagram illustrating an embodiment of an IP address manager.

FIG. 3 is a block diagram illustrating an embodiment of an IP address manager. System 300 may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

In this example, system 300 includes: an obtaining module 310, which is configured to obtain transaction address data in transaction information database; a scanning module 320, which is configured to scan the transaction address data, and obtaining IP address range corresponding to transaction address data which have identical address information and of which IP addresses are contiguous, and obtaining geographical address corresponding to the IP address range; an updating module 330, which is configured to update IP address database according to the physical address corresponding to the IP address range.

Figure 4:
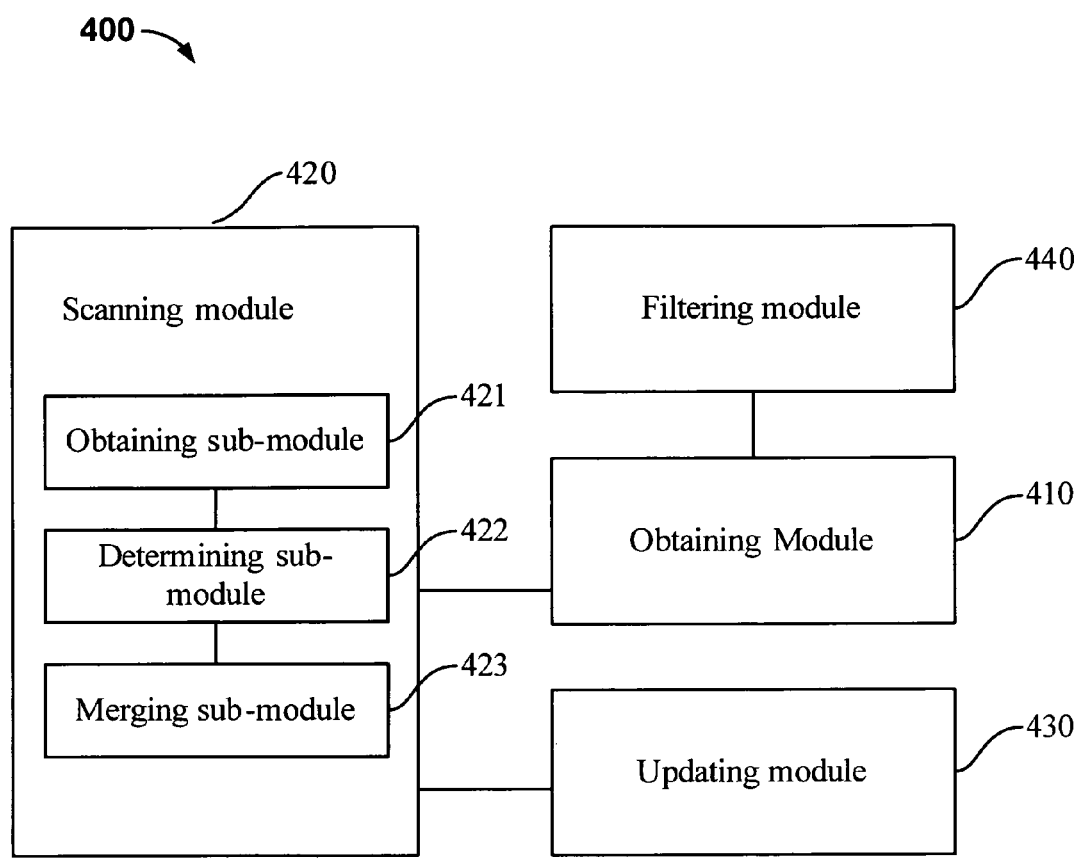
FIG. 4 is a block diagram illustrating another embodiment of an IP address manager.

FIG. 4 is a block diagram illustrating another embodiment of an IP address manager. In this example, system 400 includes: an obtaining module 410, which is configured to obtain transaction address data in transaction information database; a scanning module 420, which is configured to scan the transaction address data, obtain IP address range corresponding to transaction address data which have identical address information and of which IP addresses are contiguous, and obtain geographical address corresponding to the IP address range.

Specifically, scanning module 420 includes: an obtaining sub-module 421, which is configured to obtain the number of transaction address data having identical address information and contiguous IP addresses; a determining sub-module 422, which is configured to determine whether the number of transaction address data having identical address information and contiguous IP addresses is greater than predetermined threshold; a merging sub-module 423, which is configured to merge IP addresses of the transaction address data into one IP address range when the number of transaction address data is greater than the predetermined threshold, and setting the identical address information of the transaction address data as geographical address of the IP address range; an updating module 430, which is configured to update IP address database according to the geographical address corresponding to the IP address range. Specifically, the updating module 430 is configured to replace geographical address information corresponding to the IP address range with geographical address corresponding to the IP address range.

The device further includes: a filtering module 440, which is configured to obtain data from IP address database, order the data from IP address database and the transaction address data, filter the transaction address data according to geographical address information of the data from IP address database, and delete transaction address data whose address information does not match with geographical address information of corresponding data from IP address database.

In some embodiments, the filtering module 440 is specifically configured to filter the transaction address data according to a hierarchical level in the geographical address information hierarchy. An example geographical address information hierarchy includes the country address, provincial address, municipal address and county address.

The descriptions above are just preferred embodiments of the present invention. It should be pointed out that, to the general technical personnel in this field, not out of the premise of principle of the present invention, some improvement and decoration can be done, these improvements and decoration should also be in the protection scope of the present invention.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of updating an Internet Protocol (IP) address database, comprising:
    obtaining, using a processor, transaction address data from a transaction information database, the transaction address data including IP address information and geographical address information received during user transactions;
    processing the transaction address data to identify specific transaction address data that have overlapping geographical address information and contiguous IP addresses; and
    updating the IP address database according to the overlapping geographical address information and the contiguous IP addresses, wherein updating the IP address database includes determining whether the overlapping geographical address information determined from the transaction address data is more specific than initial geographical address information in the IP address database corresponding to the contiguous IP addresses associated with the overlapping geographical address information, in the event that the overlapping geographic address information determined from the transaction address data is more specific, then replacing the initial geographical address information in the IP database with the overlapping geographical address information determined from the transaction address data,
    wherein overlapping geographical address information being more specific comprises overlapping geographical address information being associated with a lower geographical address hierarchy level than the initial geographical address information in the IP address database; and
    wherein the processor is further configured to preprocess the transaction address data, and wherein the preprocessing includes:
    locating address data from the IP address database that has the same IP addresses as the transaction address data;
    comparing geographical addresses of transaction address data with geographical addresses of address data from the IP address database and determining whether there is inconsistency; and
    discarding specific transaction address data whose geographical address information is inconsistent with geographical address information of corresponding address data from IP address database.

2. The method according to claim 1, wherein the transaction address data stored in the transaction information database is obtained based on an electronic commerce transaction.

3. The method according to claim 1, wherein processing the transaction address data further includes:
    determining whether the number specific transaction address data that have overlapping geographical address information and contiguous IP addresses is greater than a predetermined threshold;
    in the event that the number of specific transaction address data is greater than the predetermined threshold, merging IP addresses of the specific transaction address data into an IP address range, and setting the overlapping address information as geographical address corresponding to the IP address range.

4. The method according to claim 3, wherein, the geographical address information including at least one of the following: state address, provincial address, municipal address and country address.

5. An IP address manager device comprising:
    a processor;
    the processor is configured to:
    obtain transaction address data from a transaction information database, the transaction address data including IP address information and geographical address information received during user transactions;
    process the transaction address data to identify specific transaction address data that have overlapping geographical address information and contiguous IP addresses; and
    update the IP address database according to the overlapping geographical address information and the contiguous IP addresses, wherein updating the IP address database includes determining whether the overlapping geographical address information determined from the transaction address data is more specific than initial geographical address information in the IP address database corresponding to the contiguous IP addresses associated with the overlapping geographical address information, in the event that the overlapping geographic address information determined from the transaction address data is more specific, then replacing the initial geographical address information in the IP database with the overlapping geographical address information determined from the transaction address data, wherein overlapping geographical address information being more specific comprises overlapping geographical address information being associated with a lower geographical address hierarchy level than the initial geographical address information in the IP address database; and wherein the processor is further configured to preprocess the transaction address data, and wherein the preprocessing includes:

locating address data from the IP address database that has the same IP addresses as the transaction address data;

comparing geographical addresses of transaction address data with geographical addresses of address data from the IP address database and determining whether there is inconsistency; and discarding specific transaction address data whose geographical address information is inconsistent with geographical address information of corresponding address data from IP address database; and a memory coupled to the processor, configured to provide the processor with instructions.

6. The device according to claim 5, wherein the transaction address data stored in the transaction information database is obtained based on an electronic commerce transaction.

7. The device according to claim 5, wherein processing the transaction address data further includes:

determining whether the number specific transaction address data that have overlapping geographical address information and contiguous IP addresses is greater than a predetermined threshold;

in the event that the number of specific transaction address data is greater than the predetermined threshold, merging IP addresses of the specific transaction address data into an IP address range, and setting the overlapping address information as geographical address corresponding to the IP address range.

8. The device according to claim 5, wherein, the geographical address information including at least one of the following: state address, provincial address, municipal address and country address.

9. A computer program product for updating an IP address database, the computer program product being embodied in a non-transitory computer readable storage medium and comprising computer instructions for:

obtaining transaction address data from a transaction information database, the transaction address data including IP address information and geographical address information received during user transactions;

processing the transaction address data to identify specific transaction address data that have overlapping geographical address information and contiguous IP addresses; and updating the IP address database according to the overlapping geographical address information and the contiguous IP addresses, wherein updating the IP address database includes determining whether the overlapping geographical address information determined from the transaction address data is more specific than initial geographical address information in the IP address database corresponding to the contiguous IP addresses associated with the overlapping geographical address information, in the event that the overlapping geographic address information determined from the transaction address data is more specific then replacing the initial geographical address information in the IP database with the overlapping geographical address information determined from the transaction address data, wherein overlapping geographical address information being more specific comprises overlapping geographical address information being associated with a lower geographical address hierarchy level than the initial geographical address information in the IP address database; and wherein the processor is further configured to preprocess the transaction address data, and wherein the preprocessing includes:

locating address data from the IP address database that has the same IP addresses as the transaction address data;

comparing geographical addresses of transaction address data with geographical addresses of address data from the IP address database and determining whether there is inconsistency; and discarding specific transaction address data whose geographical address information is inconsistent with geographical address information of corresponding address data from IP address database.

* * * * *